US011122929B2

(12) United States Patent
Colonna et al.

(10) Patent No.: US 11,122,929 B2
(45) Date of Patent: Sep. 21, 2021

(54) MACHINE FOR PREPARING BEVERAGES, IN PARTICULAR ESPRESSO COFFEE, A VALVE AND A VALVE UNIT THAT CAN BE USED IN SAID MACHINE

(71) Applicant: Luigi Lavazza S.p.A., Turin (IT)

(72) Inventors: Andrea Colonna, Turin (IT); Denis Rotta, Turin (IT); Gabriele Picone, Pino Torinese (IT)

(73) Assignee: Luigi Lavazza S.p.A., Turin (IT)

( * ) Notice: Subject to any disclaimer, the term of this patent is extended or adjusted under 35 U.S.C. 154(b) by 312 days.

(21) Appl. No.: 16/321,220

(22) PCT Filed: Jul. 27, 2017

(86) PCT No.: PCT/IB2017/054564
§ 371 (c)(1),
(2) Date: Jan. 28, 2019

(87) PCT Pub. No.: WO2018/020453
PCT Pub. Date: Feb. 1, 2018

(65) Prior Publication Data
US 2019/0191919 A1  Jun. 27, 2019

(30) Foreign Application Priority Data

Jul. 29, 2016 (IT) ........................ 102016000080088

(51) Int. Cl.
*A47J 31/46* (2006.01)
*A47J 31/52* (2006.01)
(52) U.S. Cl.
CPC ............. *A47J 31/52* (2013.01); *A47J 31/461* (2018.08); *A47J 31/462* (2013.01); *A47J 31/468* (2018.08); *A47J 31/469* (2018.08); *A47J 31/5255* (2018.08)

(58) Field of Classification Search
CPC .... A47J 31/5255; A47J 31/461; A47J 31/469; A47J 31/468; A47J 31/462; A47J 31/52;
(Continued)

(56) References Cited

U.S. PATENT DOCUMENTS

| | | | | |
|---|---|---|---|---|
| 3,596,675 A | * | 8/1971 | Krueger | ................ A47J 31/461 |
| | | | | 137/389 |
| 5,487,403 A | * | 1/1996 | Mollo | ..................... F04C 14/26 |
| | | | | 137/115.16 |

(Continued)

FOREIGN PATENT DOCUMENTS

| | | |
|---|---|---|
| CN | 1371650 A | 10/2002 |
| CN | 101496694 A | 8/2009 |

(Continued)

OTHER PUBLICATIONS

International Search Report for PCT/IB2017/054564 dated Oct. 13, 2017, 2 pages.

(Continued)

*Primary Examiner* — Sarang Afzali
*Assistant Examiner* — Darrell C Ford
(74) *Attorney, Agent, or Firm* — Nixon & Vanderhye P.C.

(57) ABSTRACT

A machine for preparing beverages has a hydraulic circuit including a normally open discharge valve, which comprises a main inlet connected to a fluid actuator, a main outlet connected towards a collecting space, and a valve member between the main inlet and the main outlet, for enabling and preventing a flow of fluid between the main inlet and the main outlet. The discharge valve is a hydraulically driven valve, which also comprises a driving chamber for hydraulic driving the valve member. The driving chamber has an auxiliary inlet, connected to the delivery of a pump, and an auxiliary outlet, connected to a brewing unit and to the fluid actuator, in such a way that water delivered by the pump (Continued)

passes through the driving chamber before reaching the brewing unit and the fluid actuator, respectively. The driving chamber has a further outlet, connected in fluid communication to a device for spillage of water from the driving chamber.

19 Claims, 6 Drawing Sheets

(58) Field of Classification Search
CPC ...... A47J 34/461; A47J 31/46; A47J 31/3676; A47J 31/40; A47J 31/402; F16K 31/12
USPC .... 99/300–309; 137/115.13, 115.16, 115.26, 137/115.28
See application file for complete search history.

(56) References Cited

U.S. PATENT DOCUMENTS

| | | | |
|---|---|---|---|
| 2002/0088348 A1 | 7/2002 | Cortese | |
| 2004/0079237 A1 | 4/2004 | Denisart | |
| 2009/0025762 A1 | 1/2009 | Coccia et al. | |
| 2012/0199009 A1 | 8/2012 | Zogg et al. | |
| 2013/0156913 A1 | 6/2013 | Büttiker | |
| 2014/0150664 A1* | 6/2014 | Corti | A47J 31/36 99/283 |
| 2014/0242224 A1* | 8/2014 | Glucksman | A47J 31/32 426/231 |
| 2021/0062923 A1* | 3/2021 | Gebauer | F16K 31/122 |
| 2021/0102640 A9* | 4/2021 | Baasch | F16K 31/12 |

FOREIGN PATENT DOCUMENTS

| | | |
|---|---|---|
| CN | 102349803 A | 2/2012 |
| CN | 102548456 A | 7/2012 |
| CN | 102970908 A | 3/2013 |
| CN | 202875026 U | 4/2013 |
| EP | 1353591 B1 | 3/2007 |
| WO | 2010/043952 | 4/2010 |
| WO | 2016/087996 | 6/2016 |
| WO | 2016/203363 | 12/2016 |

OTHER PUBLICATIONS

First Office Action dated Oct. 23, 2020, issued in China Application No. 201780047249.X, 7 pages.

* cited by examiner

MACHINE FOR PREPARING BEVERAGES, IN PARTICULAR ESPRESSO COFFEE, A VALVE AND A VALVE UNIT THAT CAN BE USED IN SAID MACHINE

This application is the U.S. national phase of International Application No. PCT/IB2017/054564 filed Jul. 27, 2017 which designated the U.S. and claims priority to IT Patent Application No. 102016000080088 filed Jul. 29, 2016, the entire contents of each of which are hereby incorporated by reference.

FIELD OF THE INVENTION

The present invention regards in general machines for preparing beverages, in particular espresso coffee. The invention has been developed with particular reference to discharge valves for machines of the type referred to, which comprise a fluid actuator, in particular a hydraulic actuator, used for operating closing of a brewing unit.

PRIOR ART

Various machines for preparing beverages, such as coffee, have a brewing unit that comprises at least two parts, of which at least one is movable with respect to the other. The two parts of the unit are such as to define between them a brewing chamber, when they are in a position where they are closed against one another or where they are set close to one another. A first part is configured for introduction into the brewing chamber of the water necessary for preparation of the beverage. The second part defines, instead, a housing, configured for receiving a precursor of the beverage, such as a dose of ground coffee, or else a capsule or a pod made of filter paper containing said dose of precursor, and for enabling delivery of the beverage from the brewing chamber.

These machines are usually equipped with an actuation system aimed at causing movement of at least one of the two parts of the brewing unit between an open position or position where they are set at a distance apart and the aforesaid position where they are closed against one another or where they are set close to one another. In the open position, the precursor or the capsule or the pod may be positioned in the second part of the unit, while in the closed position the water can be supplied to the unit for preparation and delivery of the beverage. After delivery, the two parts of the unit can be brought back into the open position, for removal of the precursor or capsule or pod.

The aforesaid actuation system is frequently of a manual type or of an electromechanical type. There have also been proposed machines in which the actuation system bases its own operation on a fluid actuator, in particular a piston-driven hydraulic actuator, which is supplied by exploiting the pump itself of the machine. In brief, upon start-up of a cycle of preparation of the beverage, the pump draws water from the corresponding tank, forcing it in parallel towards the brewing unit and towards the fluid actuator. The hydraulic circuit of the machine is configured in such a way that the actuator will be supplied before the brewing unit so that the unit itself will be brought into its closed position before start-up of brewing proper.

A machine of this type is known, for example, from CN 202875026 U, where the part of the unit operated by the hydraulic actuator basically comprises an injector device provided with tips for perforation of an end wall of a capsule. The second part of the unit is a drawer container, which can be manually removed from a pre-set position, defined by the structure of the machine, which delimits a space for receiving a capsule. Also the drawer container is provided with tips for perforation of a second end wall of the capsule, as well as with a nozzle for delivery of the beverage.

The present Applicant has proposed in the past machines built according to the technique described in the aforementioned prior document, which are additionally provided with a discharge valve designed for enabling return, to the tank of the machine, of the water each time used for supplying the fluid actuator.

In the aforesaid machines proposed by the present Applicant—and as explained in detail hereinafter in relation to the attached FIG. 1—the discharge valve is a normally open two-way, two-position solenoid valve. In operation, when delivery of the beverage is through, the water contained in the part of the hydraulic circuit for supply of the fluid actuator is discharged through said solenoid valve. For this purpose, a control unit de-energizes the solenoid valve, thereby opening a discharge passage that enables said water to return into the tank of the machine.

This measure is mainly adopted for preventing consumption of clean water, as well as for causing the fluid actuator to enable return of the movable part of the brewing unit into the position where it is open or set at a distance from the other part of the unit, also under the action of springs or the like.

The known solution referred to above functions excellently, but is rather costly in view of the fact that the discharge valve is a solenoid valve, which must be connected to the control unit of the machine via a purposely provided electrical control line. The control unit must moreover be equipped with suitable components for driving a valve of this sort.

There should in addition be considered the disadvantage deriving from use of an electromagnetic solenoid, to which driving of the valve member of the discharge valve is entrusted: it is known that the mechanical forces available for said driving vary in a way proportional to the amount of copper of which the coil of the solenoid is made up. In order to reduce the cost of the component, the technical solutions used consist in limiting the internal hydraulic sections of the discharge valve. This, however, entails the disadvantage of a potential soiling and blocking of the solenoid-valve component, during its service life, for example in the case where occasional impurities are contained in the water present in the tank of the machine.

AIMS AND SUMMARY OF THE INVENTION

The present invention is basically aimed at solving the aforesaid drawbacks, by means of a machine for preparing beverages of the type referred to at the start, that is inexpensive, presents reliable operation, and has a simplified electrical wiring. A further aim of the invention is to provide a valve that is particularly suitable for use in a machine of the type referred to. These and other aims are achieved, according to the invention, by a machine having the characteristics specified in the disclosure. Likewise forming a subject of the present invention is a discharge valve and valve unit for use in a machine for preparing beverages of the type defined above, as specified in the disclosure. Advantageous embodiments of the invention are specified in the disclosure. The claims form an integral part of the technical teaching provided herein in relation to the invention.

BRIEF DESCRIPTION OF THE DRAWINGS

Further aims, characteristics and advantages of the invention will emerge from the ensuing detailed description, developed purely by way of non-limiting example with reference to the attached drawings, wherein.

DESCRIPTION OF PREFERRED EMBODIMENTS

In the ensuing description, various specific details are illustrated aimed at providing an in-depth understanding of the embodiments. The embodiments may be obtained without one or more of the specific details, or with other methods, components, materials, etc. In other cases, structures, materials, or operations that are known or evident to the person skilled in the branch are not illustrated or described in detail so that the various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment", "in various embodiments", and the like, which may appear in various points of the present description do not necessarily refer to one and the same embodiment. Moreover, particular conformations, structures, or characteristics may be combined in any adequate way in one or more embodiments. The references used herein are provided merely for convenience and hence do not define the sphere of protection or the scope of the embodiments.

Figure 1:
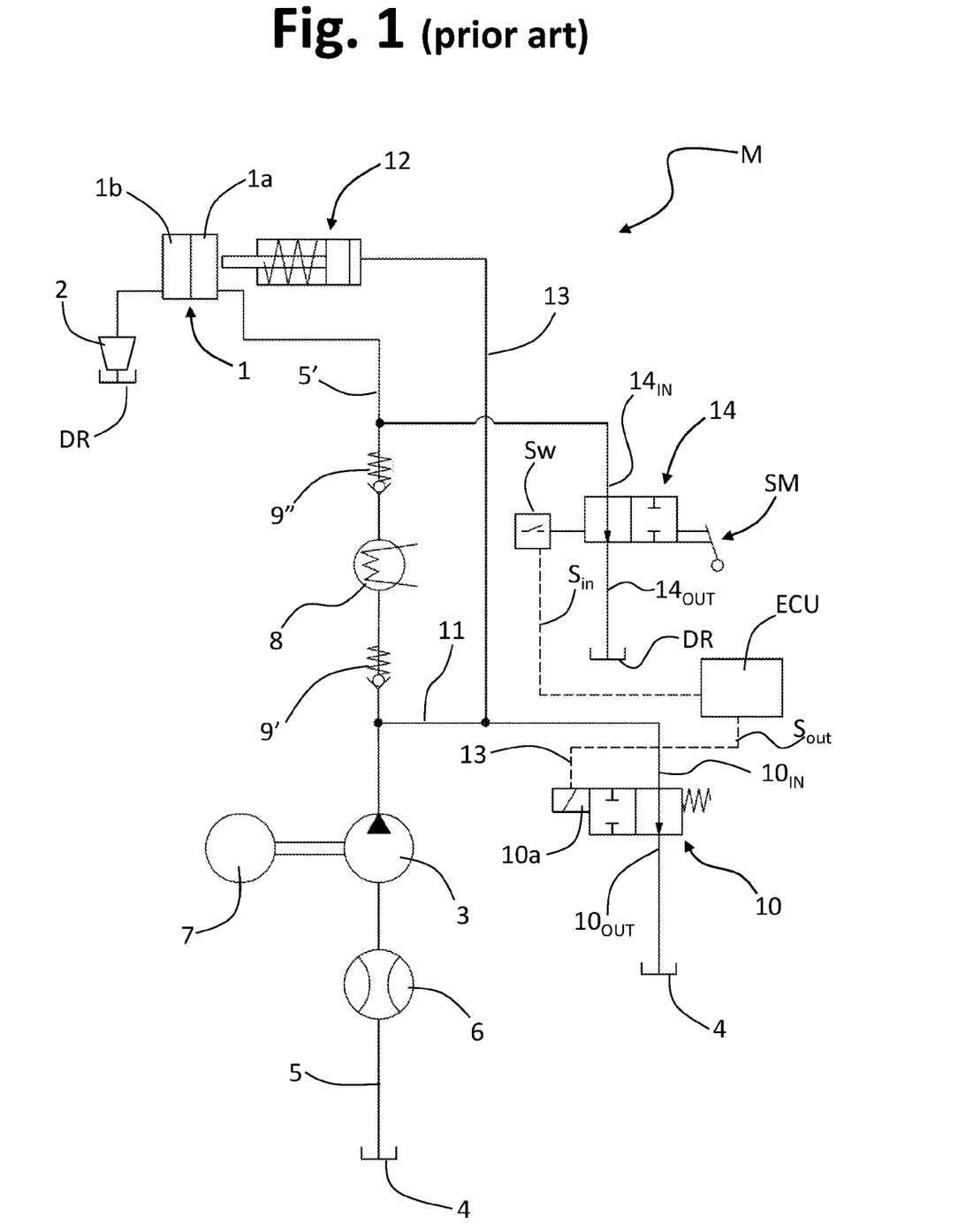
FIG. 1 is a schematic illustration of a machine for preparing beverages according to the prior art.

In FIG. 1, designated as a whole by M is a machine for preparing beverages produced in the past by the present Applicant, as mentioned previously. The machine M is illustrated limitedly to a hydraulic circuit thereof, which is of interest for the purposes of understanding the present invention. This machine M has a hydraulic circuit including a brewing unit 1, which from the hydraulic standpoint is substantially equivalent to a flow limiter, for delivering a beverage into a cup 2 or the like, for example set on a collection tray or drawer DR with which a coffee-brewing machine is usually provided.

An electric pump 3 has the inlet connected to a water tank 4 via an intake duct 5 on which a flowmeter 6 can be set, for example of the turbine type, to supply electrical signals (pulses) indicating the flow rate of water drawn in by the pump 3. The pump 3 may be a vibration electric pump, or else a pump driven by an electric motor 7, of a type in itself known.

The pressurized water delivered at outlet from the pump 3 reaches an electric heater device or boiler 8, and from this proceeds towards the brewing unit 1, through a supply line 5'. Upstream and downstream of the heater device 8 (i.e., between the pump 3 and the device 8, on the one hand, and between the device 8 and the brewing unit 1, on the other hand) two normally closed unidirectional hydraulic valves are provided, designated by 9' and 9", designed to enable a flow of water towards the brewing unit 1 when the pressure of the water coming from the pump 3 exceeds a pre-set threshold value, for example of 2 bar.

Designated by 10 is a first discharge valve, in the form of a two-way, two-position solenoid valve, having the inlet $10_{IN}$ connected to a duct 11, which extends between the outlet of the pump 3 and the unidirectional valve 9'. The outlet $10_{OUT}$ of the valve 10 is connected to the tank 4. The valve 10 is of a normally open type.

In the known machine M, the brewing unit 1 comprises at least two parts 1a and 1b, at least one of which is movable with respect to the other and which are such as to define between them a brewing chamber when they are in a closed position (where they are closed against one another) or a close position (where they are set close to one another). As already mentioned in the introductory part, a first part is configured for introduction into the brewing chamber of the heated water necessary for preparation of the beverage. The second part defines, instead, a housing, configured for receiving a precursor of the beverage (for example, a dose of ground coffee, or else a capsule containing said dose of precursor) and for enabling delivery of the beverage from the brewing chamber. With reference to the example illustrated, let us assume that the aforesaid first and second parts of the unit 1 are the ones designated by 1a and 1b, respectively, at least the first part being movable with respect to the second part. The second part 1b may for example be in the form of a drawer container or filter holder that can be removed from the machine M and repositioned thereon, as explained previously.

The machine M has an actuation system, comprising a fluid actuator, which can be controlled for causing at least displacement of the movable part 1a of the unit 1 towards the other part 1b, i.e., from an open position, or a position where the two parts are set at a distance from the aforesaid closed or close position. The open position of the two parts 1a, 1b of the unit 1 is the one that enables loading of the precursor of the beverage (or its removal after delivery), whereas in the closed position part of the water forced by the pump 3 can be supplied to the brewing chamber for preparation of the beverage and its delivery.

In the machine M exemplified displacement of the part 1a towards the part 1b is obtained via the fluid actuator designated by 12, which is supplied via the pump 3 itself that supplies the brewing unit 1. In what follows it will be assumed that the actuator 12 is a hydraulic actuator having a piston that can be displaced under the pressure of a part of the water forced by the pump 3, countering the reaction of one or more return springs or similar elastic elements. The brewing unit 1 and the corresponding fluid actuator 12 may, for example, be obtained according to the technique described in CN 202875026 U.

For this purpose, branching off from the delivery of the pump 3, between the outlet of the pump 3 and the unidirectional valve 9', is a duct 11 connected to the inlet $10_{IN}$ of the valve 10', and in turn branching off from this duct is a duct 13 for supply of the actuator 12. The actuator 12 is hence substantially supplied in parallel with respect to the brewing unit 1.

Designated by SM is a manual selector, of an electromechanical type, which can be switched between an open position (or non-delivery position) and a closed position (or delivery position). Associated to the selector SM is a second discharge valve 14, in the form of a mechanical two-way, two-position valve, having the inlet $14_{IN}$ connected between the unidirectional valve 9" and the brewing unit 1, and the outlet $14_{OUT}$ connected to the aforementioned collection tray or drawer DR. Likewise associated to the selector SM is an electrical switch Sw, designed to supply to a control unit ECU of the machine M a signal $S_{in}$ indicating the position of the selector itself, and hence of the valve 14.

For preparation of the beverage, and after the necessary dose of precursor (for example, a capsule) has been loaded into the part 1b of the unit 1, the user shifts the selector SM from the open position (represented in FIG. 1) to the closed position. The consequent displacement of the valve 14 (from right to left, as viewed in FIG. 1) closes the part of the hydraulic circuit directed to the collection drawer DR. The very movement of the selector SM causes switching of the switch Sw, which hence supplies to the control unit ECU the signal $S_{in}$, which represents start-up of a cycle of preparation of a beverage.

Once the control unit ECU has received the signal $S_{in}$, it sends a power signal $S_{out}$ (for example, between 120 and 230 V) to the solenoid 10a of the valve 10. Consequent displacement of the valve 10 (from left to right, as viewed in FIG. 1), countering the action of a corresponding spring, hence closes the part of the circuit between the duct 11 and the tank 4.

At this point the control unit ECU governs activation of the pump 3, which fills the circuit, causing an increase in pressure. In particular:
  a part of the water forced by the pump 3 can reach—via the ducts 11 and 13—the actuator 12, with the latter that hence causes passage of the part 1a of the brewing unit into its position where it is closed against, or set close to, the part 1b; the water cannot flow out of the outlet $10_{OUT}$ of the valve 10, the latter being kept by the corresponding solenoid 10a in the closed condition;
  another part of the water forced by the pump 3 can, instead, pass through the device 8 in order to be heated and then reach the unit 1, thus causing brewing and delivery of the beverage; the water is not able to flow out of the outlet $14_{OUT}$ of the valve 14, the latter being in the closed condition.

It should be noted that operation of the actuator 12, i.e., closing of the unit 1, occurs before the water at outlet from the heating device 8 reaches the unit 1. This may be obtained, for example, by appropriately determining the sections of the ducts of the "hot" branch and of the "cold" branch supplied by the pump 3 or, preferably, by adequately calibrating the springs of the unidirectional valves 9' and 9".

When the user wishes to interrupt delivery of the beverage, he or she brings the selector SM back into the initial, open, position. In this way:
  displacement of the mechanical valve 14 into the position of FIG. 1 will open the part of the circuit between the unit 1 and the unidirectional valve 9"; i.e., it will set the above part of circuit in fluid communication with the outlet $14_{OUT}$ of the valve 14 (as in FIG. 1); the residual hot water present in this part of the circuit will hence be discharged into the collection container DR;
  following upon switching of the switch Sw into the opening condition, and hence following upon interruption of the signal $S_{in}$, the control unit ECU will deactivate the pump 3 and will interrupt the supply signal $S_{OUT}$ of the solenoid 10a: under the action of the corresponding spring, the valve member of the valve 10 will hence return into its normal open position (as in FIG. 1), and the cold water present in the part of the circuit represented by the ducts 11 and 13 may return to the tank 4 via the outlet $10_{OUT}$ of the valve 10 (this also as a result of retraction of the piston caused by the corresponding spring).

In the machine according to the prior art described above, the discharge solenoid valve 10 represents a rather costly component. It comprises in fact an excitation solenoid 10a, which must be connected to the control unit ECU of the machine M via a purposely provided electrical line $S_{OUT}$. Moreover, as mentioned in the introductory part of the present description, the need to limit the amount of copper of which the coil of the solenoid 10a is made means that the valve has a reduced mechanical actuation force, and for this reason the hydraulic sections inside the valve itself are small, typically approximately 1 mm in diameter: this circumstance entails risks of blocking of the component, for example in the case where the water forced by the pump 3 were to contain occasional impurities.

A substantial saving and an improvement of operating performance may be obtained with the solution according to the present invention, possible embodiments of which will now be described with reference to FIG. 2. In this figure, the same reference numbers used previously are once again attributed to parts and elements that have already been described.

Figure 2:
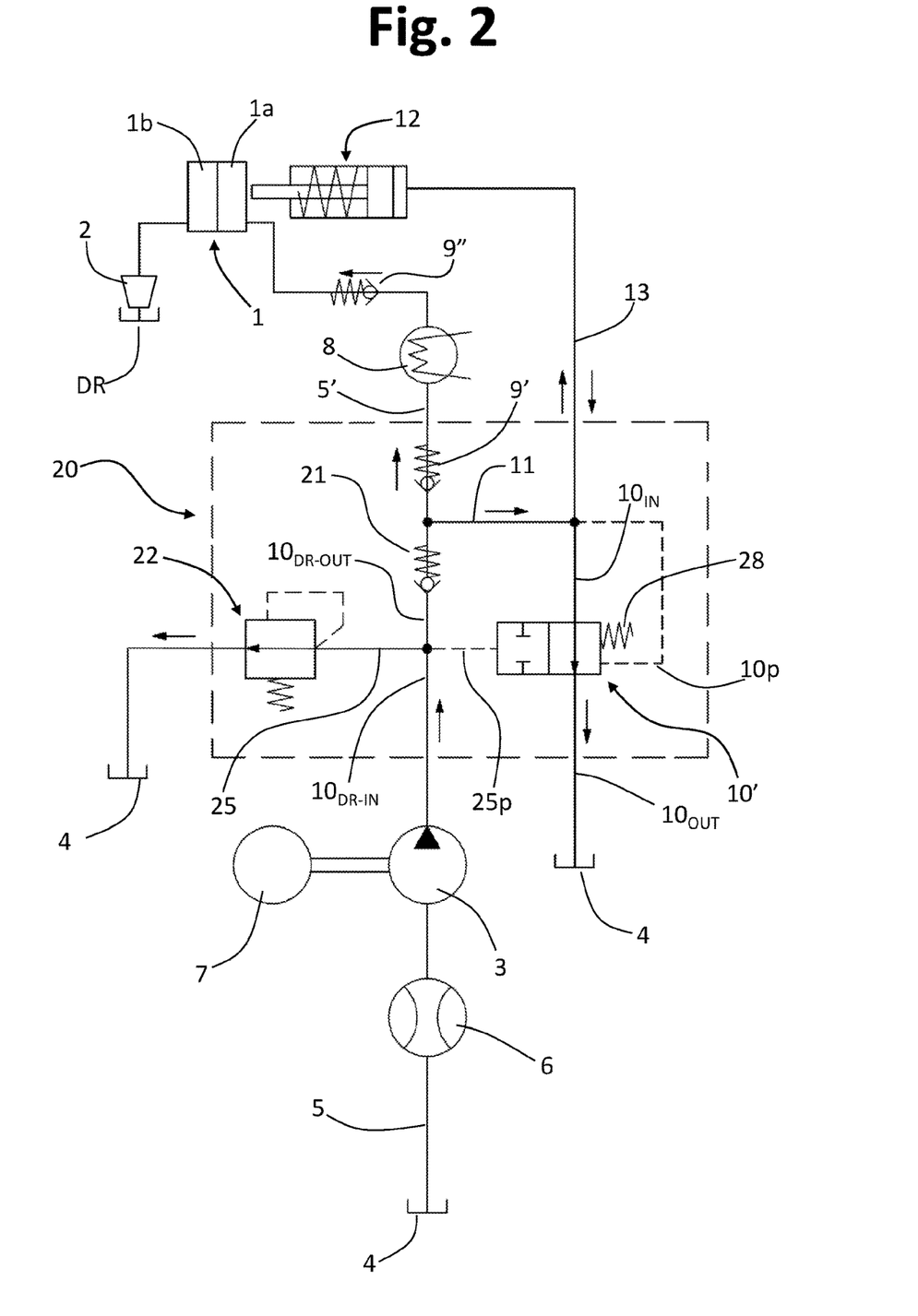
FIG. 2 shows a principle hydraulic diagram of a machine for preparing beverages according to possible embodiments of the present invention.

In the machine M according to FIG. 2, the discharge valve, designated as a whole by 10' is a hydraulically driven valve, and operatively associated thereto is a device for controlled spillage of water, such as a valve for self-priming. In preferred embodiments, the hydraulically driven discharge valve and the aforesaid spillage device are integrated in a single valve unit, such as the one designated by 20 in FIG. 2.

In various embodiments, the valve 10' is a hydraulically driven discharge valve, which comprises:
  a main inlet $10_{IN}$, designed for connection to the part of the circuit responsible for supply of the actuator 12, represented by the ducts 11 and 13;
  a main outlet $10_{OUT}$, designed to be connected in fluid communication to the tank 4;
  an auxiliary inlet $10_{DR-IN}$, designed to be connected to the delivery of the pump 3;
  an auxiliary outlet $10_{DR-OUT}$ downstream of which the fluid actuator 12 and the brewing unit 1 are to be connected in parallel, the brewing unit 1 upstream of the unidirectional valve 9' and preferably downstream of a further unidirectional valve 21; and
  a further outlet 25, designed to be set in fluid communication with a device 22 for controlled spillage of water forced by the pump 3, preferably represented by a valve for self-priming, where the device 22 has an outlet communicating with the tank 4.

As will emerge hereinafter, the outlet 25 and the main inlet $10_{IN}$ constitute respective drives for the valve 10'—designated respectively by 25p and 10p in the hydraulic diagram of FIG. 2—one set between the inlet $10_{DR-IN}$ and the outlet $10_{DR-OUT}$, upstream of the unidirectional valve 21, and the other set between the inlet $10_{IN}$ and the outlet $10_{OUT}$.

In preferred embodiments, the spillage device 22, preferably a valve for self-priming, is integrated in the further outlet 25, with the valve 10' and the device 22 that constitute an integrated valve unit 20.

The inlet $10_{IN}$ and the outlet $10_{OUT}$ are here defined as "main" in so far as they relate to the the function of main discharge of the valve 10' (i.e., the discharge of the supply line of the actuator 12), in addition to the function of hydraulic driving into the opening condition of a valve member thereof. Instead, the inlet $10_{DR-IN}$ and the outlet $10_{DR-OUT}$ are here defined as "auxiliary" in so far as they are linked basically to functions of hydraulic driving into the closing condition of the aforesaid valve member of the valve 10'.

As will be seen, the arrangement is such that, after the pump 3 has been activated for preparation of a beverage, the hydraulically driven discharge valve 10' switches automatically from its normally open condition to the closed condition. Next, once delivery of the beverage is through, the pump 3 is deactivated, and, thanks both to the connection 25 to the spillage device 22 and to the presence of the aforementioned opening hydraulic drive 10p and closing hydraulic drive 25p, the valve 10' returns autonomously to its normal opening condition, which enables discharge of the residual water present in the part of the circuit for supply of the actuator 12.

The valve 10', or the valve unit 20 that integrates it jointly with the device 22, has a simplified structure, and for its control there is not required either a solenoid or a dedicated electrical line, or again any electrical/electronic driving component.

Figure 3:
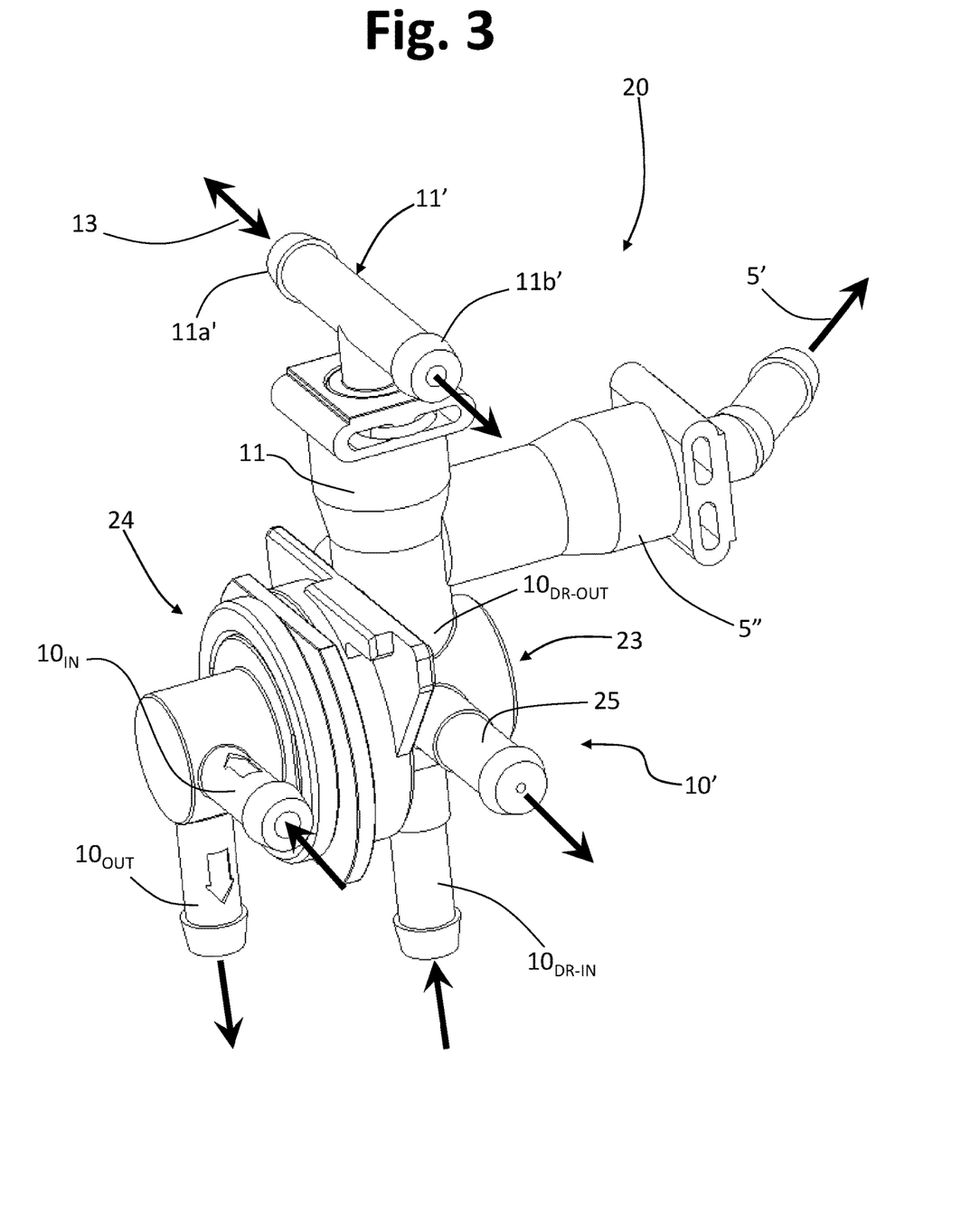
FIG. 3 illustrates, via a schematic perspective view, a valve unit that can be used in conformance with the present invention.

Illustrated in FIG. 3 is a possible embodiment of the valve 10' or of a valve unit 20 that can be used in the machine M of FIG. 2.

The valve 10' comprises a hollow body, which, in the embodiment illustrated, is formed by two elements 23 and 24, for example made of moulded plastic material, which are sealingly connected together, for example by means of a threaded coupling or an additional retention member, as in the case exemplified.

The element 23 is at least in part substantially cup-shaped in order to define an inner chamber. Sealingly coupled to one end of the element 23 is the element 24, which is also at least in part substantially cup-shaped to define an inner chamber of its own.

In the example illustrated, the element 23 defines a tubular connector that provides the auxiliary inlet $10_{DR-IN}$, a duct that provides the auxiliary outlet $10_{DR-OUT}$, as well as a tubular connector 25, to which the spillage device 22 is to be associated. Downstream of its inlet, the duct that constitutes the auxiliary outlet $10_{DR-OUT}$ defines two connectors, one that provides the duct 11 and the other, designated by 5", for connection to the brewing unit 1. Preferentially, the connectors that form the duct 11 and the connector 5" each comprise parts that are sealingly coupled together in order to enable housing therein of the unidirectional valves 21 and 9', respectively.

As will be seen hereinafter, the inlet $10_{DR-IN}$, the outlet $10_{DR-OUT}$, and the connector or duct 25 are in fluid communication with the chamber inside the element 23. Once again with reference to the example of FIG. 3, departing from the element 24 are tubular connectors that form the main inlet $10_{IN}$ and the main outlet $10_{OUT}$. Also in this case, as will be seen hereinafter, the inlet $10_{IN}$ and the outlet $10_{OUT}$ are in fluid communication with the chamber inside the element 24.

Figure 5:
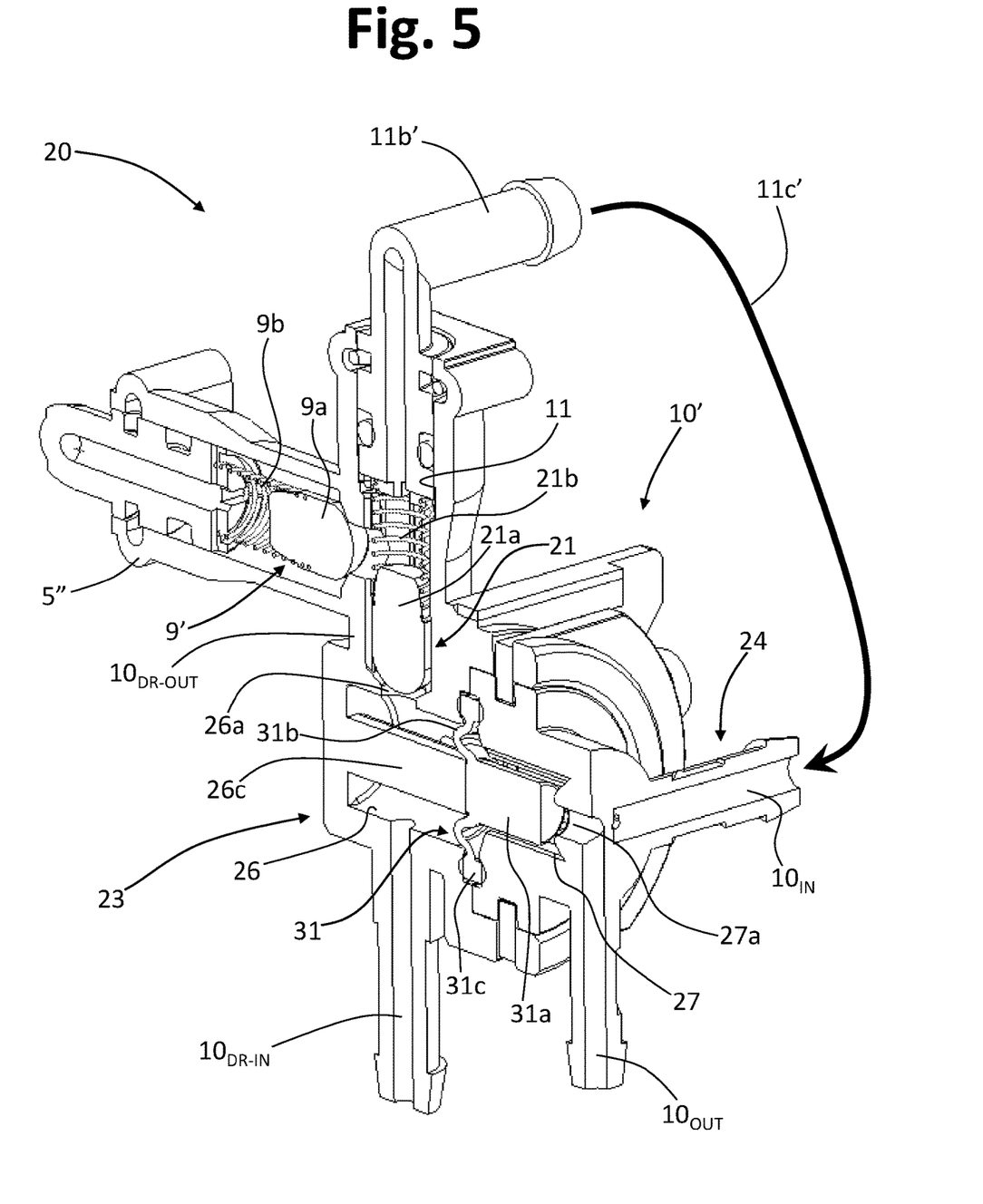
Figure 6:
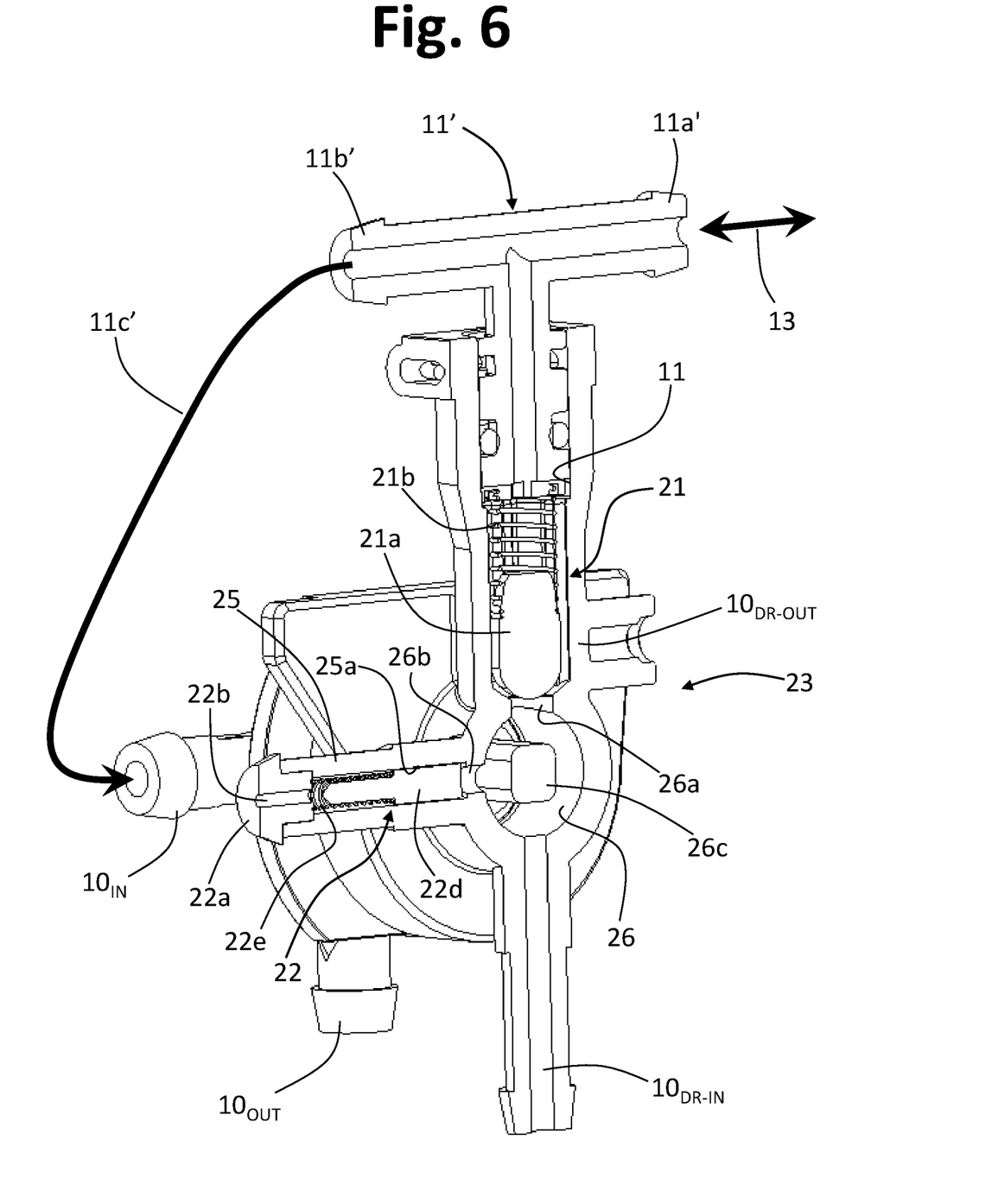

In various embodiments, associated to the connector that forms the duct 11 is the inlet of a further connector, which is substantially T-shaped, designated by 11' in FIG. 3, the two opposite outlets of which define a first attachment 11a' for fluidic connection to the duct 13 (see also FIG. 2), and a second attachment 11b' for connection to the main inlet $10_{IN}$, via a tube not represented in FIG. 3 but represented schematically in FIGS. 5 and 6, where it is designated by 11c'.

Figure 4:
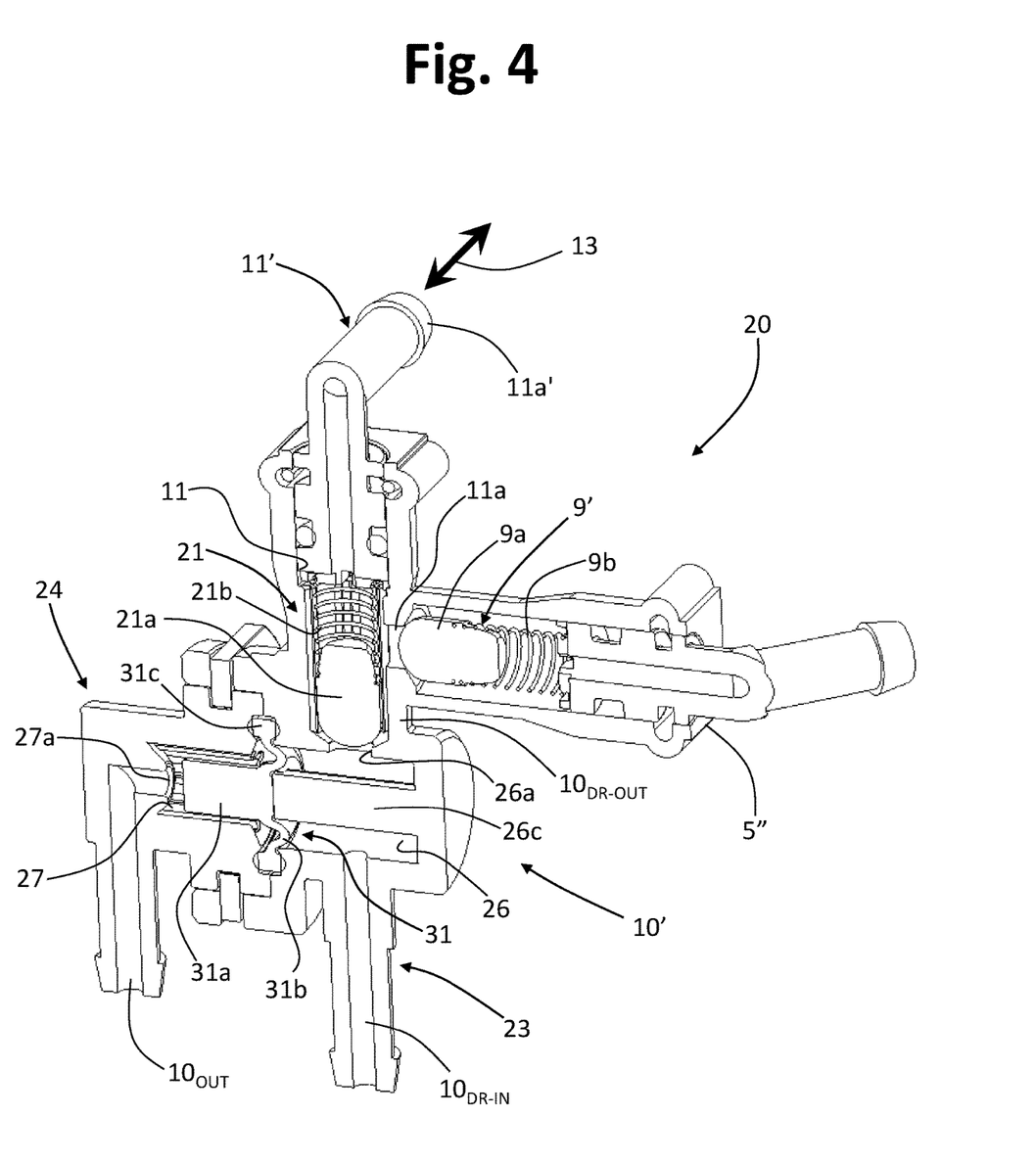
FIGS. 4, 5, and 6 illustrate, via respective schematic axial sections, a valve unit that can be used in conformance with the present invention.

The inner structure of the valve unit is visible in FIGS. 4-6. In these figures, designated by 26 is the already mentioned inner chamber of the substantially cylindrical element 23, which is in fluid communication with the driving inlet $10_{DR-IN}$, here in a lateral or radial position with respect to the chamber 26 itself. The chamber 26 has a first lateral port 26a, which constitutes the inlet of the duct that forms the outlet $10_{DR-OUT}$, where a valve (open/close) element 21a of the unidirectional valve 21 is located. The unidirectional valve 21 prevents the potential back-flow of cold water coming from the duct 13 of the actuator 12. In addition, calibration thereof enables complete actuation of the valve 10' during operation of the pump 3. This valve 21 further comprises a calibrated helical spring 21b, designed to urge the valve element 21a constantly into the respective position for closing the port 26a. Preferentially, the valve 21 is housed within the connector that forms the duct 11: the latter, as already mentioned, preferentially includes two tubular parts sealingly coupled together in order to enable assembly of the valve 21.

Downstream of the unidirectional valve 21, departing from the connector that forms the duct 11 is the connector 5", which in various embodiments houses within it the unidirectional valve 9', comprising the corresponding valve element 9a and the calibrated spring 9b. Also the connector 5", as already mentioned, preferentially includes two tubular parts sealingly coupled together in order to enable assembly of the valve 9'.

The chamber 26 has a second lateral port 26b (FIG. 6), where the tubular connector or duct 25, which, in preferred embodiments, houses within it the spillage device 22, extends outwards.

In preferred embodiments, the device 22 is a valve for self-priming. The valve 22 may be of any type known in the sector for use in combination with small pumps, in particular vibration pumps. In the example of embodiment illustrated in FIG. 6, the valve 22 basically consists of an element 22a for closing the connector 25, defining a through hole 22b that constitutes an outlet of the valve 22. The hole 22a has a diameter smaller than the axial cavity 25a of the connector 25, slidably housed in which is a piston 22d, which has a portion of restricted section at the end thereof facing the hole 22b. Fitted on the portion with restricted section is the proximal end of a helical spring 22e. In the example illustrated, the distal end of the spring 22e bears upon the closing element 22a that defines the outlet 22b. The spring 22e is calibrated for keeping the end of the restricted section of the piston 22d in a position spaced apart from the hole 22b, without, however, occluding the port 26b. The piston 22d has a portion with a diameter substantially corresponding to that of the cavity 25a, provided on its surface with recesses that enable in any case a modest passage of liquid between the port 26b and the hole 22b. It should be noted that, also in the condition of maximum compression of the spring 22e, the piston 22d might not determine closing of the hole 22b in such a way that the valve 22 will always enable seepage of liquid in the presence of pressurized water in the chamber 26.

The self-priming device 22, which can be used for the purposes of implementation of the invention, may also be of a type different from what has been exemplified herein, provided that its function is preserved, basically consisting in allowing a modest spillage or bleeding of liquid from the port 26*b*, which tends to eliminate any air that may be present in the hydraulic circuit downstream of the pump 3 of FIG. 2.

Once again in FIGS. 4 and 5, designated by 27 is the already mentioned inner chamber of the substantially cylindrical element 24, which is in fluid communication with the main inlet $10_{IN}$ of the unit 20, here defined by a connector in a radial position on the element 24. The chamber 27 has a port 27*a*, here defined centrally on the bottom of the chamber 27, in fluid communication with a connector that forms the main outlet $10_{OUT}$. Preferentially, the port 27*a* is defined at a valve seat, preferably formed by a tubular relief of the bottom of the chamber 27.

Housed within the chamber 27 is a valve member 31. Provided at the lower end of the member 31 is a closing element 31*a*, which is mounted in an axially slidable way in the chamber 27 and is able to close the outlet port 27*a*, whereas provided at upper end is a membrane element, designated as a whole by 31*b*, the outer edge 31*c* of which is constrained in a respective seat (not indicated), defined between two surfaces of interface of the elements 23 and 24. The membrane element 31*b* may be conveniently made of elastic or resilient material, such as a rubber or a silicone. Advantageously, the elements 31*a* and 31*b* may be made of a single body, but not excluded from the scope of the invention is the case of a valve member 31 made up of a number of parts assembled together.

In various embodiments, the membrane element 31*b* is configured for urging the closing element 31*a* towards the position of opening of the outlet port 27*a* of the chamber 27. On the other hand, in possible variant embodiments, the first end of a calibrated helical spring (exemplified schematically only in FIG. 2, where it is designated by 28) can bear on the bottom of the chamber 27, around the seat where the port 27*a* is defined. The second end of the above calibrated helical spring is instead associated to the member 31, for example bearing upon a corresponding seat or contrast surface defined on the member 31, further down with respect to the membrane element 31*b* (for example, defined by an annular enlargement of the element 31*a*).

As will be seen, the valve member 31 is used for hydraulic driving of the valve 10'.

The outer edge 31*c* of the membrane element 31*b* and the corresponding seat are sized to guarantee liquid tightness towards the outside of the valve body. As may be noted, the two chambers 26 and 27 are substantially mutually coaxial and sealingly separated from one another by means of the membrane element 31*b* of the member 31.

Operation of the valve unit 20 of FIGS. 3-6 is described in what follows.

For preparation of a beverage, introduced into the brewing unit 1 (FIG. 2) is the necessary dose of precursor of the beverage, for example ground coffee contained in a capsule, according to modalities in themselves known. For instance, the user removes the aforementioned drawer container or filter holder that defines the part 1*b* of the brewing chamber and positions thereon the dose of precursor, preferably contained in a capsule or pod. The container or filter holder can then be put back on the machine in the predefined position, with the compartment for the precursor axially aligned to the part 1*a*.

The user then issues a command for delivery of the beverage, with consequent starting of the pump 3. Unlike the prior art represented in FIG. 1, in this case the command for starting delivery can be imparted via switching of a simple electrical switch or pushbutton (not represented), hence without any need for an electromechanical selector of the type denoted by SM in FIG. 1.

During the first steps of delivery, the water arriving from the pump 3 reaches the chamber 26 via the driving inlet $10_{DR-IN}$, filling it progressively. The pressure in the chamber 26 increases progressively, being countered by the calibration of the spring 21*b*, enabling the membrane 31*b* to prevent fluid communication between the chambers 27 and the outlet $10_{OUT}$. When the pressure of the water in the chamber 26 overcomes the calibration of the spring 21*b* of the unidirectional valve 21, which is relatively low, the corresponding valve element 21*a* shifts, thus opening the port 26*a*. In this way, water forced by the pump 3 can pass into the outlet $10_{DR-OUT}$ and then split into two flows:

a first flow passes through the connector that forms the duct 11, up to the T-shaped connector designated by 11'; and a second flow, traversing the port designated by 11*a* only in FIG. 4, can pass into the connector 5".

The aforesaid first flow reaches the connector 11' and then passes into the duct 13, through the corresponding attachment 11*a'*, before reaching the hydraulic actuator 12. Supply of the actuator 12 brings about displacement of the part of chamber 1*a* into the position where it is closed against the part 1*b* (see FIG. 2). As mentioned previously, in the case of use of a capsule containing the dose of precursor of the beverage, the part 1*a* of the unit 1 may include a series of tips that cause perforation of an end wall of the cartridge itself. On the other hand, if necessary, also the part 1*b* of the unit 1 may be provided with similar tips, designed to cause perforation of the opposite end wall of the capsule, under the thrust exerted thereon by the part 1*a*, which moves towards the part 1*b* (it should in any case be noted that the invention may be used also in combination with machines, the brewing unit of which is conceived for receiving pre-perforated capsules, or else pods made of filter paper, or else directly the precursor in powdered or granular form).

In this step, part of the water of the aforementioned first flow can fill the attachment 11*b'*, the tube 11*c'*, and the main inlet $10_{IN}$, but without it being discharged into the tank 4, this considering the fact that in this step the port 27*a* of the chamber 27 is kept in a closed condition via the valve member 31, as explained hereinafter.

The aforementioned second flow can pass through the connector 5" when the pressure of the water in the port 11*a* overcomes the calibration of the spring 9*b* of the unidirectional valve 9', and the corresponding valve element 9*a* opens the port 11*a*. In this way, the second flow can reach the heating device 8, pass beyond the unidirectional valve 9", and then reach the brewing unit 1 in order to enable delivery of the beverage into the container 2.

It should be noticed that, given the presence of the unidirectional valves 9' and 9" (see also FIG. 2), the calibration value of which is preferentially greater than that of the unidirectional valve 21, the first flow will reach the actuator 12 and will cause corresponding driving thereof before the second flow can reach the brewing unit 1.

The pressure of the water in the chamber 26 determines bending of the membrane element 31*b* of the member 31 (also overcoming the calibration of the spring 28 possibly present in the chamber 27). This bending causes translation of the closing element 31*a* until it comes into with the upper edge of the tubular relief, defined in which is the port 27*a*, which is hence closed. During this initial step the valve for self-priming 22 in fluid communication with the chamber 26 guarantees the presence of pressurized water inside the chamber itself, at the same time enabling limitation of the presence of air in the circuit downstream of the pump 3. The modest amount of water that traverses the valve for self-priming 22 is clean water and can hence be made to flow towards the tank 4, via the connector 25, to which a suitable tube can be connected.

During delivery of the beverage, part of the pressurized water present between the attachment 11b' of the connector 11' and the tube 11c' (FIGS. 5-6) can reach the inside of the chamber 27, through the main inlet $10_{IN}$ This water cannot flow out through the port 27a, given the closed condition of the latter as a result of the valve member 31. Consequently, the pressure created in the chamber 27 tends to act on the member 31 bringing it into the opening condition (in addition to the action of the spring 28 that may be present in the chamber 27): this condition does not, however, allow opening of the port 27a in so far as the force due to the pressure (and of the possible spring 28) acting in the chamber 27 does not equal or overcome the pressure present in the chamber 26. Likewise, the water in the chamber 27 cannot reach the water contained in the chamber 26, given the action of isolation between the chambers 26 and 27 exerted by the membrane element 31b of the member 31. In this step, the valve for self-priming 22 continues to operate, as described above.

At the end of delivery, the pump 3 is de-activated by the operator, who again switches of the aforementioned electrical switch or pushbutton. In this way, the self-priming valve 22 guarantees a sudden drop of pressure in the chamber 26 and at the driving inlet $10_{DR-IN}$. On the other side, the unidirectional valves 21 and 9' (and 9") can reclose, thanks to the action of the corresponding springs 21b and 9b.

The drop of pressure in the chamber 26, by means of the drive 25p of FIG. 2, causes the stress exerted on the membrane element 31b of the member 31 that separates the two chambers 26 and 27 to cease. In this way, the member 31, pushed by the pressure of the chamber 27, via the corresponding drive 10p of FIG. 2 (and by the spring 28 that may be present in the chamber 27), can translate in a direction opposite to the previous one, thereby enabling the closing element 31a to move back into the initial position, thus opening the port 27a of the chamber 27. Translation of the member 31, i.e., bending in a direction opposite to the previous one of the membrane element 31b, is preferentially limited by a mechanical end-of-travel, here represented by the proximal end of a central axial relief 26c of the chamber 26.

In this condition, the main outlet $10_{OUT}$ is now in fluid communication, via the chamber 27, with the main inlet $10_{IN}$, and hence with the actuator 12, via the tube 11c', the attachment 11b' of the connector 11', and the tube 13. The water present in the part of circuit for supply of the actuator 12 can thus flow out through the main outlet $10_{OUT}$ towards the tank 4. In this step, then, the water present in the duct 13 follows a path opposite to the previous one, favoured therein also by recession of the piston of the actuator 12, which is urged in this direction by the corresponding spring. The part 1a of the brewing unit 1 then returns into the respective open position or a position at a distance away from the part 1b.

The residual water that may be present between the brewing unit 1 and the unidirectional valve 9" may contain residues of the beverage and/or of its precursor (for example, powdered coffee). This water may be emptied out by gravity into a collection container of the type designated by DR in FIG. 2. This may be obtained, according to modalities in themselves known, via an appropriate arrangement of the part 1a of the unit 1 and of the part of the corresponding supply duct between the unidirectional valve 9" and the unit itself (for example, an inclined or substantially vertical arrangement).

As may be noted, operation of the valve 10' is essentially based upon the differential pressures that are set up at different moments in the chambers 26 and 27 via the respective drives 25p and 10p of FIG. 2, in particular during and after activation of the pump 3. In particular, after the pump 3 has been activated for preparation of the beverage, the valve member 31 passes from the open condition to the closed condition as a result of the pressure of the water in the driving chamber 26, determined by operation of the pump itself. Next, after the pump 3 is deactivated at the end of delivery of the beverage, the pressure in the driving chamber 26 decreases as a result of the action of bleeding caused by the valve 22 or similar device, thereby enabling the valve member 31 to revert into the opening condition, as a result of the pressure transmitted by the drive 10p and present at the inlet $10_{IN}$, i.e., in the chamber 27 (in addition to the force of the spring 28 that may be present in the chamber 27).

From the foregoing description, the characteristics of the present invention emerge clearly, as likewise do its advantages. Amongst these the following should be emphasized:

the solution proposed is decidedly inexpensive, in view of the elimination of a solenoid, and hence of the cost for its copper coil, which is necessary for operation of traditional discharge solenoid valves;

the cost of the solution is further reduced in so far as there are not required either an electromechanical selector of the type designated by SM in FIG. 1 or a specific electrical wiring for connection and control of the hydraulically driven discharge valve; also the control electronics of the machine is simplified, since there is no longer the need for an electronic driving component, such as a TRIAC, which is typically necessary in the case of discharge solenoid valves according to the prior art;

the fact that driving of the discharge valve is of a hydraulic type enables increase of the sections of passage of the parts of the circuit for the fluid actuator, which can be brought from a value of approximately 1 mm in diameter, which is traditionally envisaged in the case of use of solenoid valves, to approximately 2 mm in diameter, in the case of the present invention;

production of the discharge valve, even when it integrates the valve for self-priming or similar device for controlled spillage, is simple and inexpensive; to this there may be added the fact that the valve for self-priming that can be used for implementation of the invention may be of a commercially available type, and hence of limited cost; of course, also guaranteed is correct priming of the pump of the machine, given the elimination of air from the circuit of the machine;

operation of the discharge valve is reliable and substantially independent both of the calibration of the springs of usual unidirectional valves provided on the supply branch of the brewing unit and of the pressure generated in the aforesaid branch by the dose of precursor of the beverage present in the brewing chamber (the pressure of which is also a function of the amount of ground coffee, for example the amount contained in a capsule); the time of triggering of the valve is moreover short and guaranteed;

hydraulic driving of the discharge valve does not have adverse effects on attainment of the correct pressures in the brewing chamber of the machine.

Of course, the embodiments and the details of construction may vary widely with respect to what has been described and illustrated herein purely by way of non-limiting example, without thereby departing from the scope of the invention as defined in the annexed claims.

As has been mentioned, construction of the valve member 31 may differ from the one—exemplified herein—that envisages a single body that defines the closing element 31a and the membrane element 31b. For instance, in possible variant embodiments, the member 31 may include an intermediate body of plastic material set between the elements 31a and 31b, which are configured as distinct parts. Such an intermediate body may possibly provide a contrast surface for the upper end of the spring 28 that may be present inside the chamber 27, which normally tends to urge the valve member into its condition of opening of the port 27a.

In embodiments described previously, the hydraulically driven discharge valve 10' and the device 22, such as a self-priming valve, are integrated in a single valve unit 20. It is, however, to be pointed out that this does not constitute an essential characteristic of the invention, given that in possible variant embodiments the device 22 may be mounted also in a position remote from the valve 10', downstream of the connector designated by 25, for example connected to the latter via a suitable duct. Likewise, hydraulic connection components that constitute the ducts or connectors 11, 11', 5" could be configured as parts distinct from the valve, which are connected in fluid communication to the outlet $10_{DR\text{-}OUT}$.

In other embodiments of the invention, the necessary tightness between the chambers 26 and 27 could be determined, instead of by a membrane element of the type designated by 31b, by means of one or more rings that gird the outside of the member 31, in particular around a closing element thereof of the type designated by 31a, for example of an O-ring type, which slide on the inner surface of the chamber 27. Use of a membrane element must in any case be considered preferable in so far as it enables increase in the reliability of the valve in view of the absence of sealing elements subject to sliding.

The invention has been previously described by way of example with reference to use in combination with an actuator designed for moving a part of the brewing unit of the machine M. The discharge valve described may, however, be used for supply and/or discharge of similar fluid actuators—in particular hydraulic actuators in which the movement of return of a corresponding piston is determined by elastic means—that are used on the brewing machine for other purposes, in particular for bringing about displacement of one or more members of the brewing machine other than a part of its brewing unit (for example, for switching a system for release of a hatch of the machine itself).

The invention claimed is:

1. A machine for preparing beverages, comprising a hydraulic circuit including:
    a brewing unit, comprising at least one first part and one second part able to define a brewing chamber therebetween, when the at least one first part and the at least one second part are in a closed or close position, at least the first part of the brewing unit being movable with respect to the second part;
    a fluid actuator, which can be supplied for causing at least a displacement of the first part of the brewing unit towards the second part;
    a water tank;
    a pump having the inlet connected in fluid communication with the water tank and the outlet or delivery connected in fluid communication with the brewing unit and with the fluid actuator;
    at least one normally closed first unidirectional hydraulic valve set between the pump and the brewing unit, to enable a flow of water towards the brewing unit when pressure of the water delivered by the pump exceeds a pre-set threshold;
    a heating device for heating the water forced by the pump towards the brewing unit; and
    a normally open discharge valve having:
    a main inlet, connected to the fluid actuator;
    a main outlet, connected towards a collecting space;
    a valve member set between the main inlet and the main outlet, suitable to assume an open condition and a closed condition, in which the valve member enables and prevents, respectively, a flow of fluid between said main inlet and said main outlet, the valve member being optionally urged by a spring towards the open condition;
    wherein the discharge valve is a hydraulically driven valve, which further comprises a driving chamber, for hydraulic driving of the valve member, an auxiliary inlet of the driving chamber, connected to the delivery of the pump, and an auxiliary outlet of the driving chamber, connected to the brewing unit and to the fluid actuator in such a way that the water delivered by the pump passes through the driving chamber before reaching the brewing unit and the fluid actuator, respectively;
    the discharge valve moreover having a further outlet of the driving chamber, connected in fluid communication with a device for spillage of water from the driving chamber;
    the hydraulic circuit being configured such that:
    after the pump is activated for preparation of the beverage, the valve member passes from the open condition to the closed condition as a result of the pressure of the water in the driving chamber caused by operation of the pump; and
    after the pump is deactivated at the end of the delivery of the beverage, pressure in the driving chamber drops due to the spillage caused by the device for spillage, thereby enabling the valve member to revert to the open condition as a result of the pressure present at the main inlet of the discharge valve.

2. The machine according to claim 1, wherein the device for spillage comprises a device for self-priming.

3. The machine according to claim 1, wherein the discharge valve and the device for spillage are integrated in one and the same valve unit.

4. The machine according to claim 1, wherein:
    the discharge valve comprises a further chamber communicating with the main inlet and the main outlet, the further chamber having a bottom in which a valve seat is defined;
    the valve member comprises a membrane element associated to which is a closing element that is able to co-operate with the valve seat;
    the membrane element sealingly separates the driving chamber from the further chamber and is elastically flexible to enable displacement of the closing element associated thereto with respect to the valve seat, between the closure element and the bottom of the further chamber being optionally operatively set said spring.

5. The machine according to claim 4, wherein the closing element and the membrane element are formed in a single piece.

6. The machine according to claim 1, wherein set between the first unidirectional valve and the heating device is a second unidirectional valve.

7. The machine according to claim 1, wherein provided downstream of the auxiliary outlet of the driving chamber are a first connector and a second connector, for fluidic connection in parallel of the brewing unit and of the fluid actuator, respectively.

8. The machine according to claim 7, wherein the second connector has a first outlet and a second outlet, the first outlet being connected in fluid communication to the fluid actuator, and the second outlet being connected in fluid communication to the main inlet of the discharge valve.

9. The machine according to claim 7, wherein:
set between the first unidirectional valve and the heating device is a second unidirectional valve; and
the first unidirectional valve is associated to the second connector and the second unidirectional valve is associated to the first connector.

10. The machine according to claim 9, wherein the first and second connectors each comprises two parts sealingly coupled together, set between which is a corresponding unidirectional valve.

11. A normally open discharge valve for a machine for preparing beverages according to claim 1, the normally open discharge valve having:
a main inlet, designed for connection to a fluid actuator of the machine;
a main outlet, designed for connection towards a collecting space;
a valve member set between the main inlet and the main outlet, suitable to assume an open condition and a closed condition, in which the valve member enables and prevents, respectively, a flow of fluid between said main inlet and said main outlet, the valve member being optionally urged by a corresponding spring towards the open condition;
wherein the normally open discharge valve is a hydraulically driven valve that further comprises:
a driving chamber for hydraulic driving of the valve member;
an auxiliary inlet of the driving chamber, designed for fluidic connection to the delivery of a pump of the machine;
an auxiliary outlet of the driving chamber, designed for fluidic connection to a brewing unit and to the fluid actuator of the machine, in such a way that water delivered by the pump passes through the driving chamber before reaching the brewing unit and the fluid actuator of the machine, respectively;
a further outlet of the driving chamber, designed to be connected in fluid communication with a device for spillage of water from the driving chamber.

12. The normally open discharge valve according to claim 11, integrating the device for spillage to form a valve unit.

13. The normally open discharge valve according to claim 11, comprising one further chamber communicating with the main inlet and the main outlet, the further chamber having a bottom, defined in which is a valve seat, and wherein:
the valve member comprises a membrane element associated to which is a closing element that is able to co-operate with the valve seat, between the closing element and the bottom of the further chamber being optionally operatively set said spring;
the membrane element sealingly separates the driving chamber from the further chamber and is elastically flexible to enable displacement of the closing element associated thereto with respect to the valve seat.

14. The normally open discharge valve according to claim 11, further comprising, downstream of the auxiliary outlet of the driving chamber, a first connector and a second connector for fluidic connection in parallel of the brewing unit and of the fluid actuator, respectively.

15. An integrated valve unit for use in a machine for preparing beverages, comprising a hydraulically driven discharge valve according to claim 11 and a device for spillage of water.

16. The valve unit according to claim 15, wherein the device for spillage of water is a device for self-priming.

17. The machine according to claim 1, wherein the fluid actuator is a hydraulic actuator.

18. The machine according to claim 1, wherein the collecting space comprises the water tank.

19. A normally open discharge valve for a machine for preparing beverages, having:
a main inlet, designed for connection to a fluid actuator of the machine;
a main outlet, designed for connection towards a collecting space;
a valve member set between the main inlet and the main outlet, suitable to assume an open condition and a closed condition, in which the valve member enables and prevents, respectively, a flow of fluid between said main inlet and said main outlet, the valve member being optionally urged by a corresponding spring towards the open condition;
wherein the normally open discharge valve is a hydraulically driven valve that further comprises:
a driving chamber for hydraulic driving of the valve member;
an auxiliary inlet of the driving chamber, designed or fluidic connection to the delivery of a pump of the machine;
an auxiliary outlet of the driving chamber, designed for fluidic connection to a brewing unit and to the fluid actuator of the machine, in such a way that water delivered by the pump passes through the driving chamber before reaching the brewing unit and the fluid actuator of the machine, respectively; and
a further outlet of the driving chamber, designed to be connected in fluid communication with a device for spillage of water from the driving chamber.

* * * * *